P. O'THAYNE.

Ironing-Tables.

No. 5,824.

Reissued April 7, 1874.

Witnesses:

Chas. Raettig

F. V. Briesen

Inventor:

Patrick O'Thayne by his attorney

A. V. Briesen

AM. PHOTO-LITHOGRAPHIC Co. N.Y. (OSBORNE'S PROCESS.)

UNITED STATES PATENT OFFICE

PATRICK O'THAYNE, OF NEW YORK, N. Y.

IMPROVEMENT IN IRONING-TABLES.

Specification forming part of Letters Patent No. 118,878, dated September 12, 1871; reissue No. 5,824, dated April 7, 1874; application filed February 11, 1874.

*To all whom it may concern:*

Figure 1:
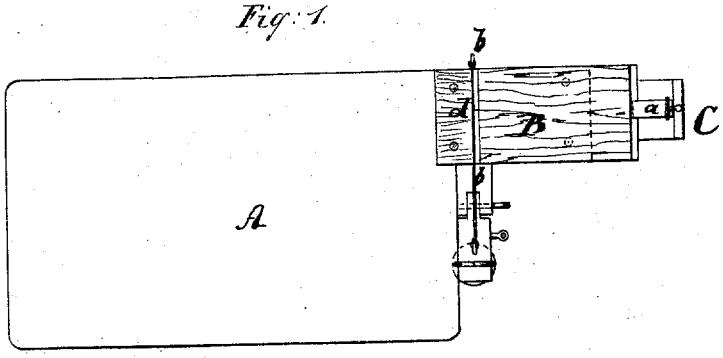
Figure 2:
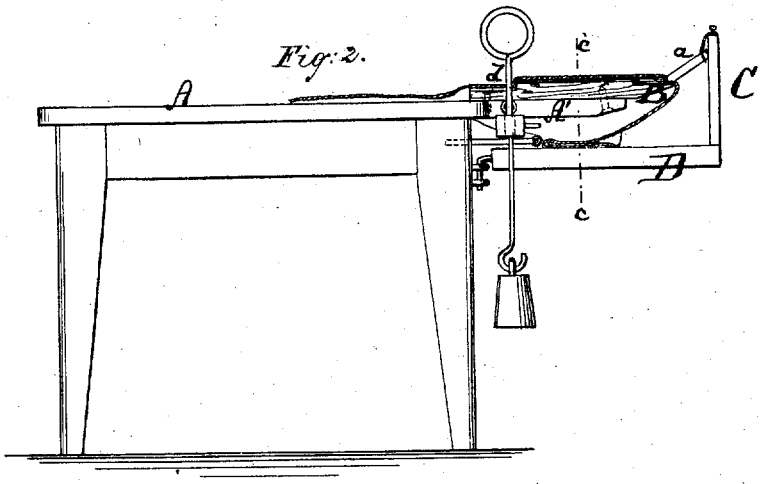
Figure 3:
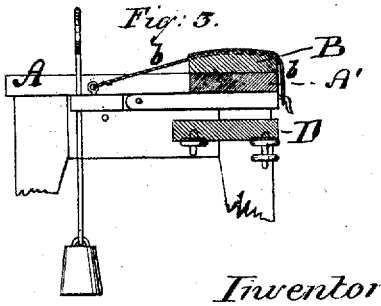

Be it known that I, PATRICK O'THAYNE, of the city of New York, in the county of New York and State of New York, have invented a new and Improved Ironing-Table, of which the following is a specification:

Figure 1 is a top view of my improved ironing-table; Fig. 2, a side elevation of the same; Fig. 3, a transverse vertical section on the line *c c*, Fig. 2.

Similar letters of reference indicate corresponding parts in all the figures.

The object of this invention is to provide an ironing-table, for laundry or family use, with an attachment for conveniently holding and stretching shirt-bosoms.

Heretofore it was a matter of great inconvenience in ironing properly to hold shirt-bosoms stretched, and devices have already been proposed, previous to my invention, for holding down one end of the bosom, the other end to be held stretched by the hand of the laundress; but as it is important that the laundress should have her hand free to arrange the plaits and ruffles, the single fastener is insufficient for giving fine results.

I have improved the ironing-table by providing the bosom-board attachment thereof with double fasteners for the shirt-bosom, one at each end, and thus permitting the bosom to be held stretched, and leaving both hands of the laundress free, one to guide the iron, the other to handle the folds, plaits, &c.

In the accompanying drawing, the letter A represents the top of a suitable ironing-table, and B the bosom-board, which is either placed and secured upon the table A, or projects from one end or side thereof, as shown. In the latter case the bosom-board can be fastened upon an extension, A′, of the top A, as indicated in Fig. 2. Opposite one end of the bosom-board B is a standard or upright, C, which is stationary, being either fastened to a board, D, that is hooked to the table, as shown, or supported on the floor, or otherwise held securely in position. A short brace or piece of wood, *a*, is, by a string or otherwise, connected with the standard C in such manner that it can be placed against the end of the bosom-board, as in Fig. 2, or suspended loosely from the standard. Over the other end of the bosom-board is laid a cord, *b*, which is held fast at one end and weighted at the other. The bosom to be ironed is, when the piece *a* is not braced against the board B, slipped over the said bosom-board, and one end of it is then clamped by the brace *a*. Then the bosom is properly stretched on B, and the weighted cord *b* laid over it, preferably into a recess, *d*, of the bosom-board, all as shown in Figs. 1 and 2.

The bosom is now held fast at both ends, and can be ironed to perfection, the person ironing it being enabled to give his or her whole attention to the proper ironing without being diverted by the charge of holding the bosom in place.

I claim as my invention—

1. The combination of the ironing-table A with the bosom-board attachment B, and with the devices *a* and *b*, for holding the bosom to be ironed securely at both ends, substantially as specified.

2. The brace *a*, in combination with the support C and bosom-board B, as specified.

P. O'THAYNE.

Witnesses:

A. V. BRIESEN,

CHAS. RAETTIG.